United States Patent
Kawasaki et al.

(10) Patent No.: US 6,671,760 B1
(45) Date of Patent: Dec. 30, 2003

(54) SWITCHING SYSTEM FOR CONTROLLING INTERNAL APPARATUSES IN AN EXCHANGE SYSTEM

(75) Inventors: Hiroya Kawasaki, Kawasaki (JP); Masaki Kira, Kawasaki (JP); Atsushi Fujihira, Kawasaki (JP); Kiyofumi Mitsuze, Kawasaki (JP); Hidetoshi Iwasa, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/364,583

(22) Filed: Jul. 30, 1999

(30) Foreign Application Priority Data

Sep. 2, 1998 (JP) ............................................. 10-247955

(51) Int. Cl.⁷ ......................... G06F 13/42; G06F 13/36; G06F 13/00
(52) U.S. Cl. ......................... 710/106; 710/308; 710/316
(58) Field of Search ................................. 710/316, 305, 710/124, 107, 308, 106; 713/320; 370/394, 395.1; 375/257; 359/139

(56) References Cited

U.S. PATENT DOCUMENTS

| | | | | |
|---|---|---|---|---|
| 4,058,672 A | * | 11/1977 | Crager et al. | ............... 370/394 |
| 5,557,609 A | * | 9/1996 | Shobatake et al. | ...... 370/395.71 |
| 5,890,005 A | * | 3/1999 | Lindholm | .................. 713/320 |
| 6,243,779 B1 | * | 6/2001 | Devanney et al. | .......... 710/305 |
| 6,343,102 B1 | * | 1/2002 | Kira et al. | ................... 375/257 |
| 6,441,935 B1 | * | 8/2002 | Araki et al. | ................. 359/139 |

FOREIGN PATENT DOCUMENTS

| | | |
|---|---|---|
| JP | 07154395 | 6/1995 |
| JP | 08307398 | 11/1996 |

* cited by examiner

*Primary Examiner*—Tim Vo
(74) *Attorney, Agent, or Firm*—Katten Muchin Zavis Rosenman

(57) ABSTRACT

A switching system for controlling internal apparatuses provided within an exchange system includes a central controller and a switching module including a plurality of objective apparatuses, each objective apparatus including a control data end unit, controlled by the central controller based on DMA communication and SD/SCN signal. Further, the central controller includes a first processor access controller which transfers control data to the control data end unit, in order to check and control each of objective apparatus, based on the DMA communication and the SD/SCN signal. The switching module includes a second processor access controller which relays the control data transferred between the first processor access controller and a plurality of control data end units-based on the DMA communication and the SD/SCN signal. According to the present invention, it is possible to realize high speed data transfer and high reliability based on the DMA communication and the SD/SCN signal between the central controller and each objective apparatus.

7 Claims, 17 Drawing Sheets

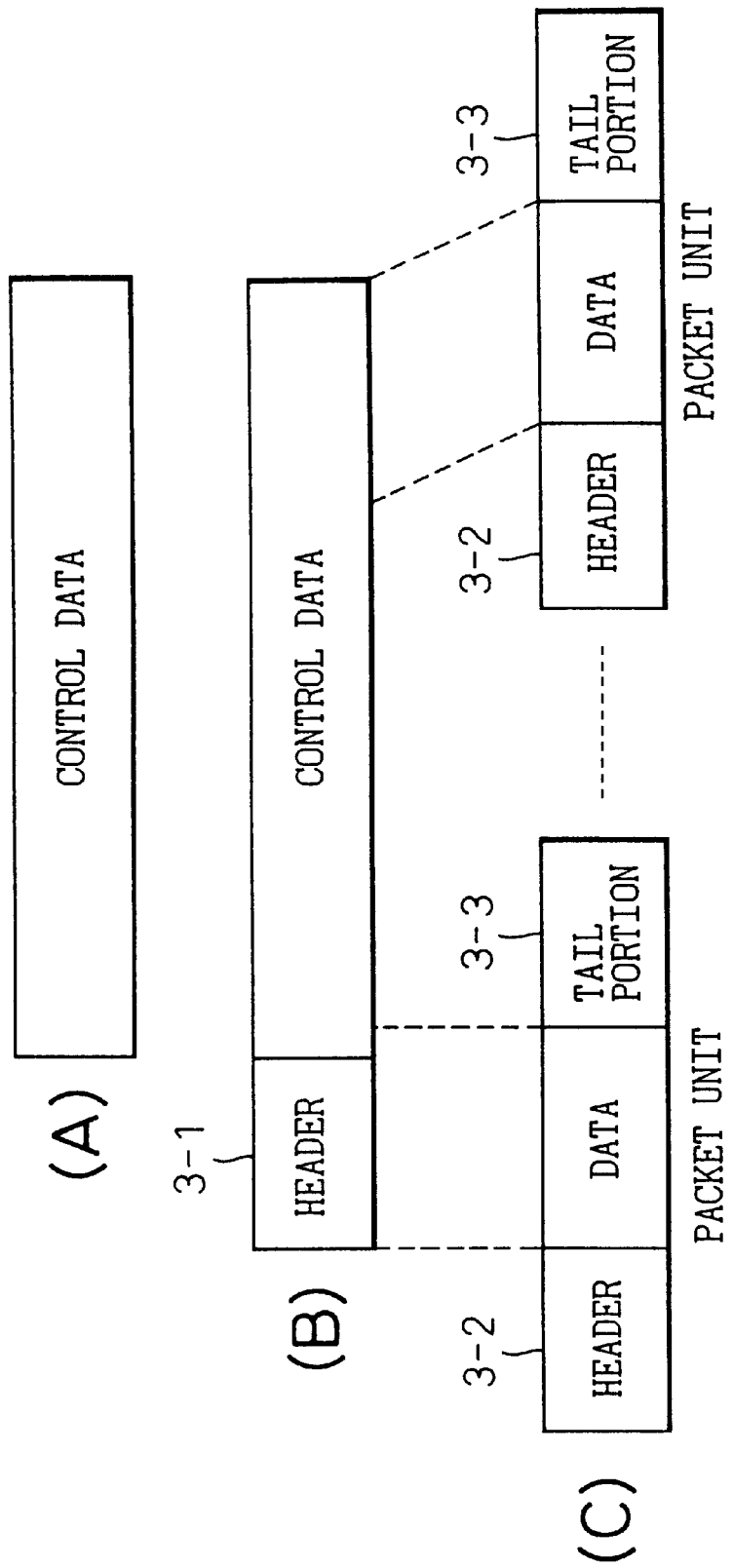

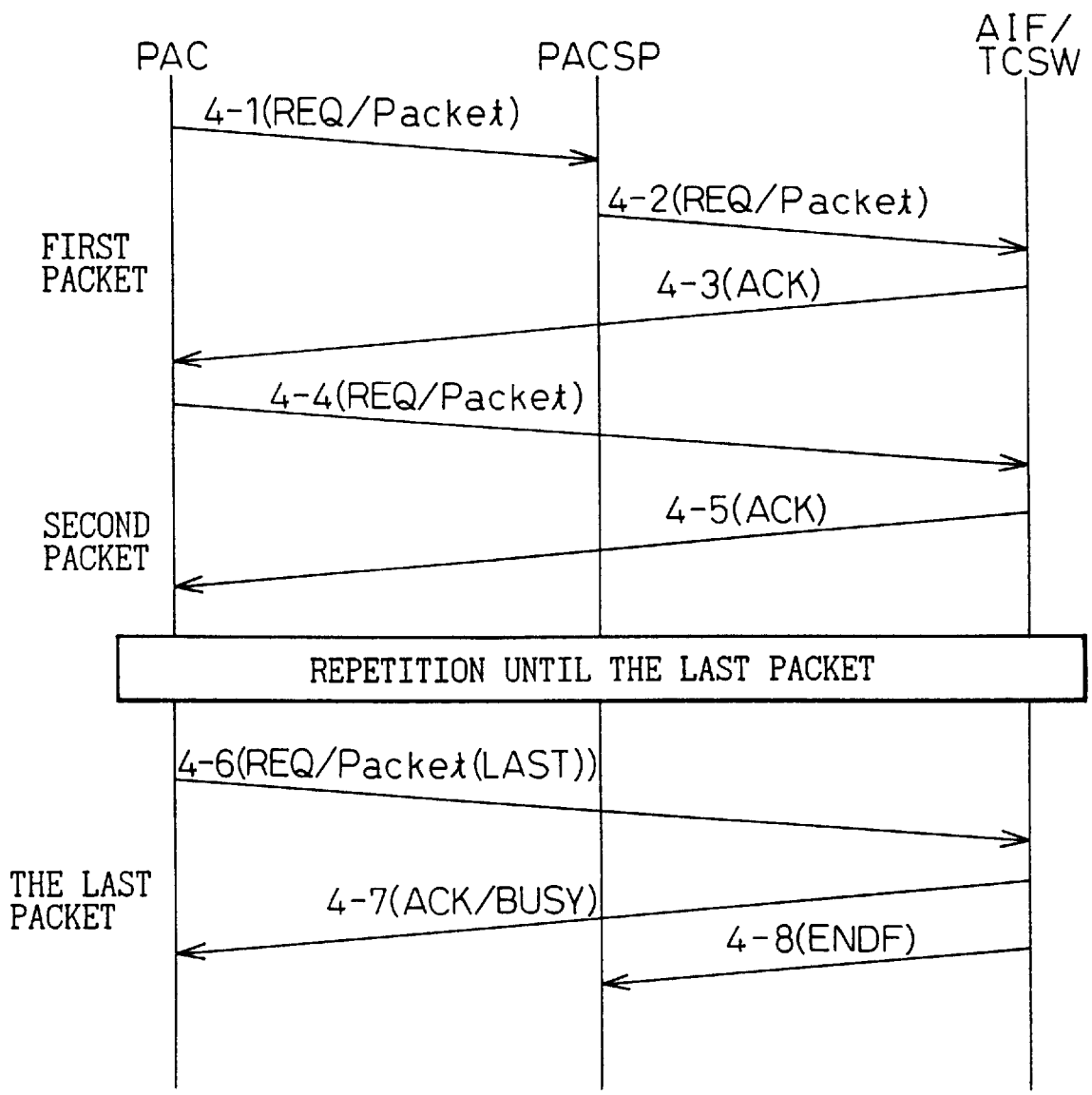

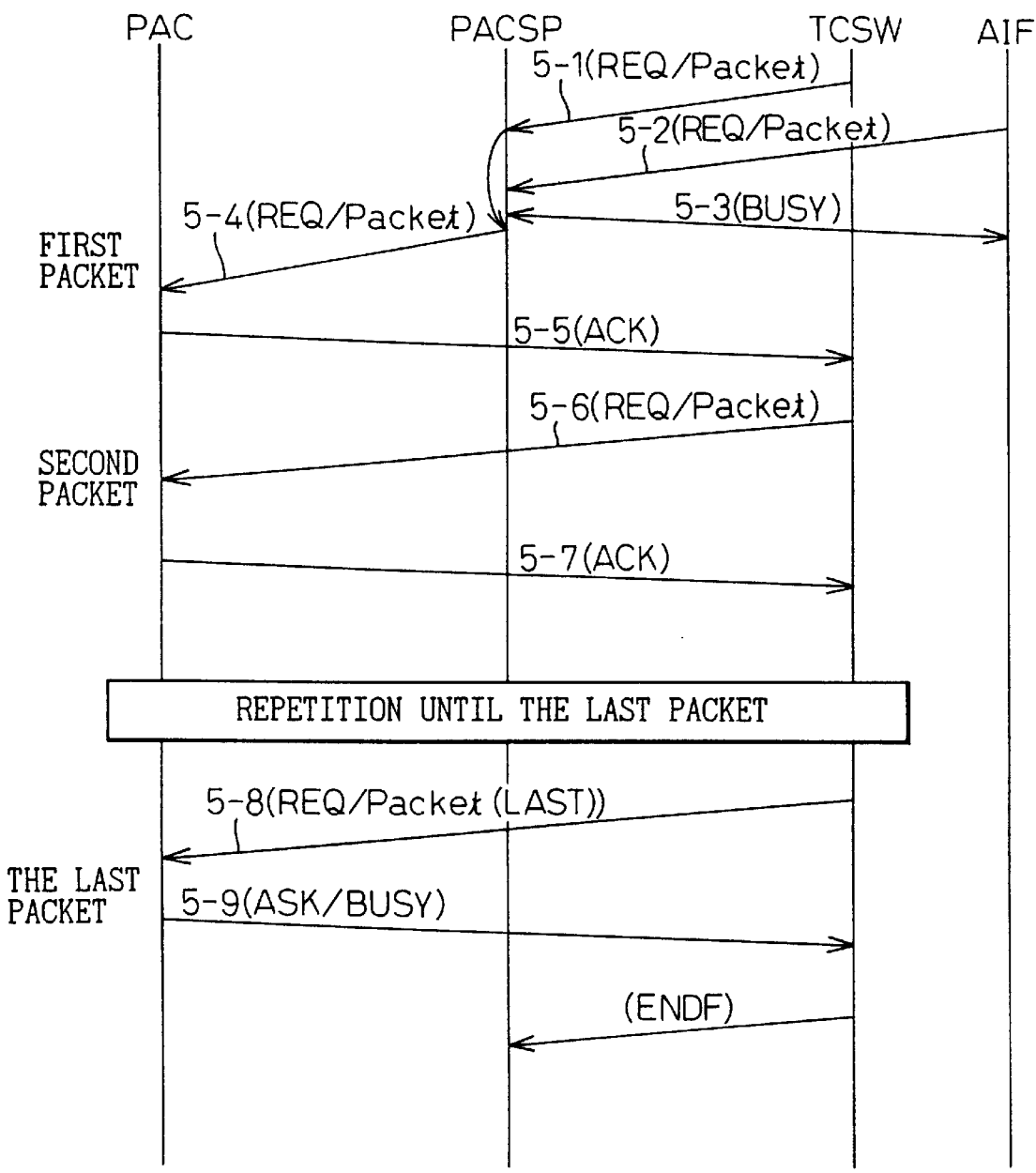

Fig.6

| NAME OF SIGNAL | FUNCTION | BMSD SETTING ACCOMMODATION POSITION | OBJECTIVE BROADCAST | |
|---|---|---|---|---|
| | | | TCSW | |
| SWACT | TCSW ACT DISPLAY | TCSW bit 12 | ○ | ○ |
| 1 day | TIME SET (1 DAY) | TCSW bit 32 | ○ | ○ |
| 1 h | TIME SET (1 HOUR) | TCSW bit 33 | ○ | ○ |
| 15 M | TIME SET (A QUARTER) | TCSW bit 34 | ○ | ○ |
| 5 M | TIME SET (FIVE MINUTES) | TCSW bit 35 | ○ | ○ |
| HRST | HARDWARE RESET | TCSW bit 36 | | ○ |
| PRST | MICRO PROCESSOR RESET | TCSW bit 37 | | ○ |
| PACRST | PAC SEQUENCE RESET | TCSW bit 38 | ○ | ○ |
| FRST | FAULT RESET | TCSW bit 39 | | ○ |
| PH-B | HOST PH-B RESTART DISPLAY | TCSW bit 40 | ○ | ○ |
| PH-D | HOST PH-D RESTART DISPLAY | TCSW bit 41 | ○ | ○ |
| AUX 1 | AUXILIARY 1 | TCSW bit 42 | ○ | ○ |

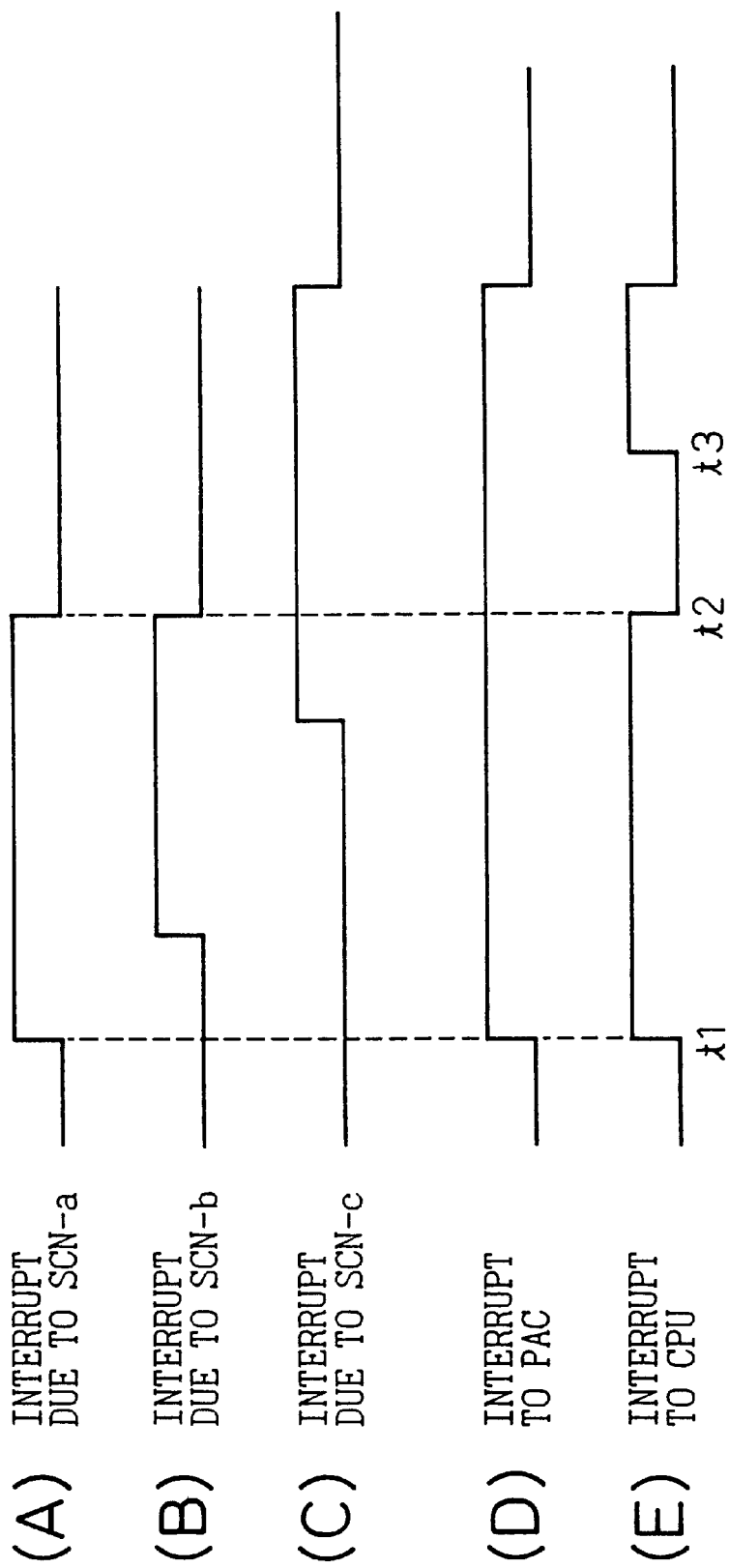

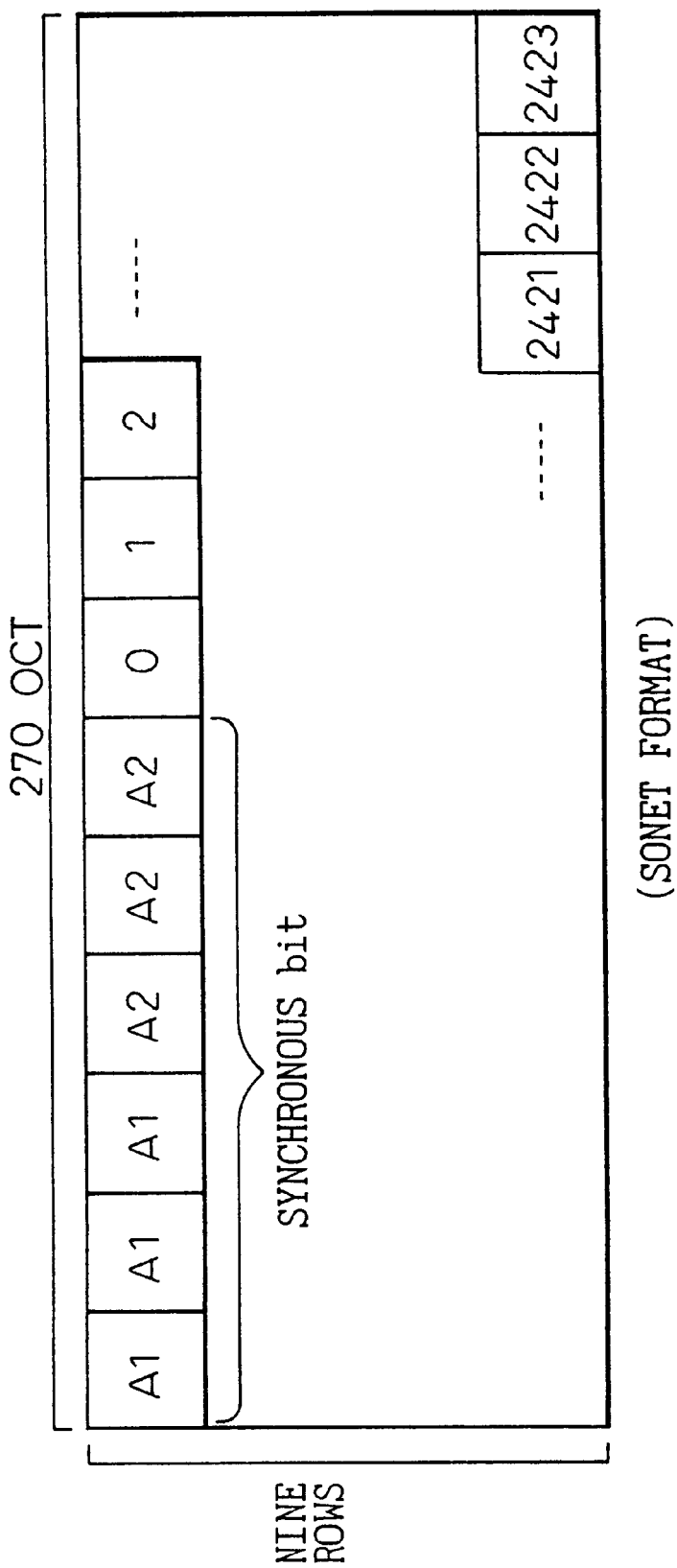

Fig.11

| bit No. | CONTENT |
|---|---|
| 0 ⸳ 7 | DMA DATA BIT 0 ⸳ DMA DATA BIT 7 |
| 8 | SYNC (PREVENTION BIT) |
| 9 | REQ |
| 10 | ACK |
| 11 | ACT |
| 12 | BUSY |
| 13 | SD 0 (SCN 0) |
| 14 | SD 1 (SCN 1) |
| 15 | PAC SEQUENCE RESET |

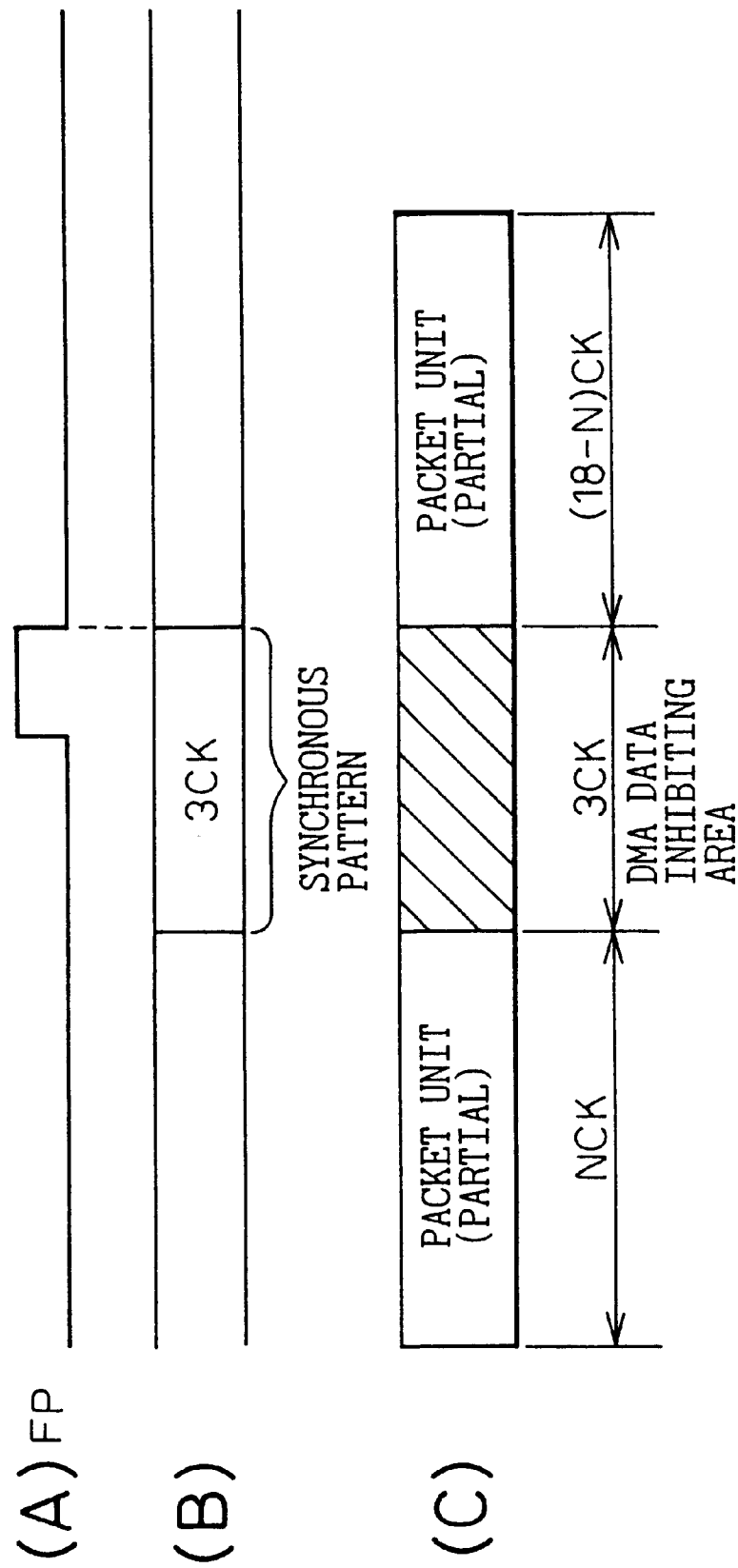

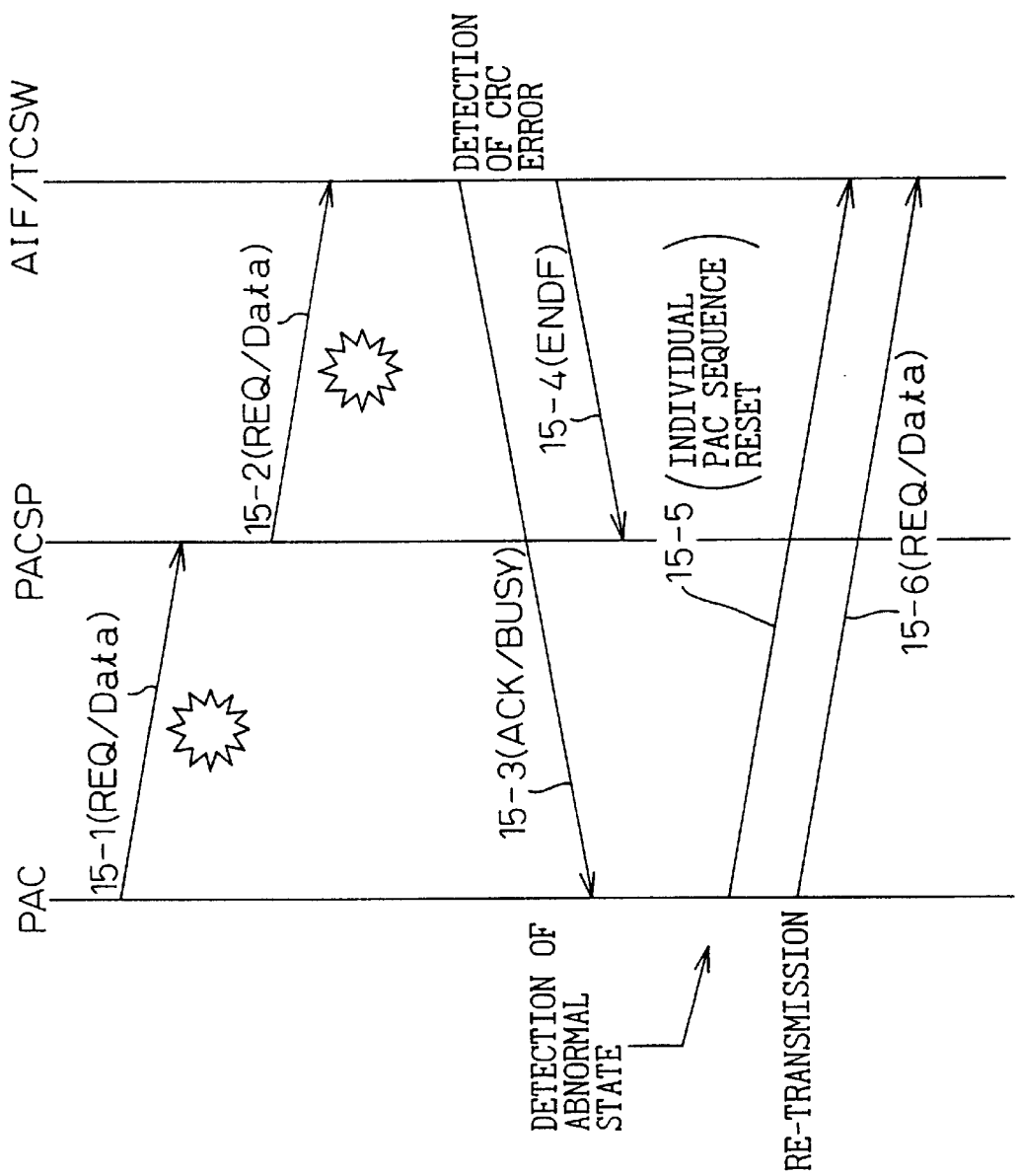

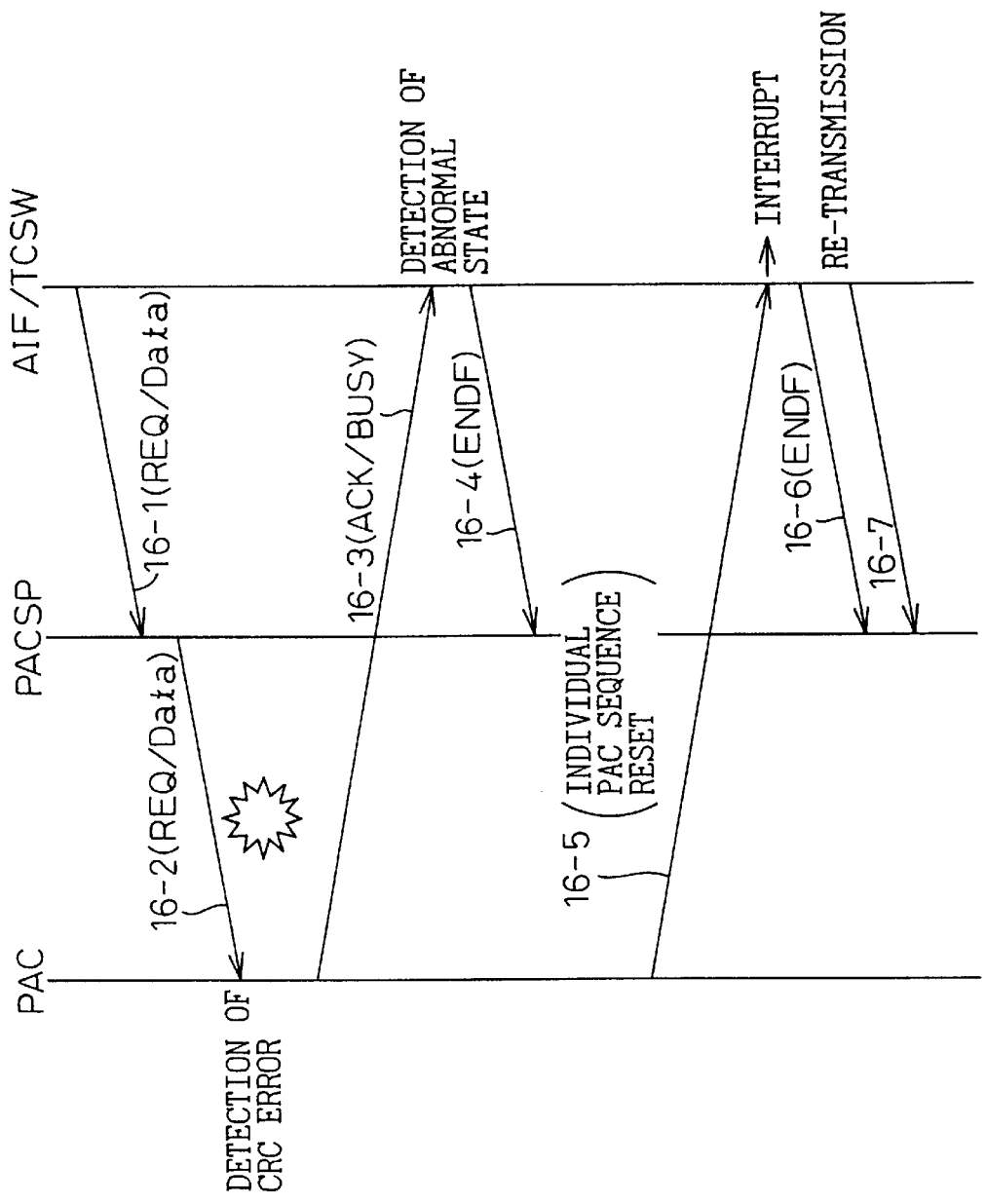

SWITCHING SYSTEM FOR CONTROLLING INTERNAL APPARATUSES IN AN EXCHANGE SYSTEM

BACKGROUND OF THE INVENTION

1. Field of the Invention

The present invention relates to a switching system, for controlling internal apparatuses provided within an exchange system, based on DMA (Direct Memory Access) communication and an SD/SCN (Signal Distributor/ Scanner) signal.

2. Description of the Related Art

In general, an exchange system is formed by a central controller and a switching module including a plurality of objective apparatuses to be controlled by the central controller. The data transfer between the central controller and the plurality of objective apparatuses are performed based on DMA communication and an SD/SCN signal used as control data. In the exchange system, there is a switching system for transferring the control data in order to check and control the internal apparatuses from a processor access controller provided in the central control apparatus.

In a conventional system, however, there are some problems as briefly explained below.

First, in a method of transferring the control data based on the SD/SCN signal in accordance with a handshake procedure after termination of the DMA communication, it is very difficult to realize high speed control because of delays in various procedures at the DMA communication.

Second, when a link for the DMA communication is not established between the central controller and the objective apparatus, it is impossible to transfer the control data based on the SD/SCN signal between the central controller and each objective apparatus, and to perform an appropriate control for each objective apparatus based on the SD/SCN signal.

Third, it is necessary to transfer data including various parameters in order to control call processes and to collect charging data, and these data are transferred in accordance with the handshake procedure based on the DMA communication. However, since various control data based on the SD/SCN signal and call process information based on the DMA communication are transferred in accordance with the same handshake procedure, the efficiency of data transfer becomes worse and the call process rate is not improved.

Fourth, since the control data are transferred through signal lines each using a known metallic transmission cable, there are various disadvantageous points, as follows. That is, it is impossible to increase transfer frequency to more than several tens of MHz, the above metallic transmission cable emits much radio energy to an external environment, and much emission of radio energy results in the occurrence of noise.

Accordingly, in the switching system for controlling internal apparatuses provided within the exchange system, the present invention aims to solve the above conventional problems and to realize high speed data transfer and high reliability based on the DMA communication and the SD/SCN signal between the central controller and each objective apparatus. Further, the present invention aims to realize transfer of the control data without emission of radio energy to an external environment.

SUMMARY OF THE INVENTION

The primary object of the present invention is to provide a switching system for controlling internal apparatuses provided within an exchange system which can realize high speed data transfer and high reliability based on the DMA communication and the SD/SCN signal between the central controller and each objective apparatus.

Another object of the present invention is to provide a switching system for controlling internal apparatuses provided within an exchange system which can realize transfer of the control data without emission of radio energy to the external environment.

In accordance with a first aspect of the present invention, there is provided a switching system comprising: a central controller which transfers control data to a plurality of end units; and a switching module including a processor access controller which relays the control data transferred between the central processor and the plurality of end units; wherein the central controller and the processor access controller comprise a transmitter and receiver which set the control data based on a direct memory access (DMA) communication therebetween and based on SD/SCN signal, to each bit position of each fixed time slot.

In accordance with another aspect of the present invention, there is provided a switching system for controlling internal apparatuses provided within an exchange system which includes a central controller and as witching module including a plurality of objective apparatuses, each objective apparatus including a control data end unit, controlled by the central controller based on DMA communication and SD/SCN signal, wherein:

the central controller comprises a first processor access controller which transfers control data to the control data end unit, in order to check and control each of objective apparatus, based on the DMA communication and the SD/SCN signal;

the switching module comprises a second processor access controller which relays the control data transferred between the first processor access controller and a plurality of control data end units based on the DMA communication and the SD/SCN signal;

each of the first and second processor access controllers comprises a transmitter and a receiver which sets the control data based on the DMA communication and the control data based on the SD/SCN signal to a bit position of a fixed time slot, and transfers the control data by using an optical signal; and the second processor access controller comprises a DMA connection selector which switches connection path in accordance with an address of a first transmission request packet unit, and sends the control data based on the DMA communication to a predetermined path; and the second processor access controller further comprises a transfer unit which periodically transfers the control data based on the SD/SCN signal to the bit position of the fixed time slot.

In a preferred embodiment, the processor access controller comprises a transfer unit which copies a particular SD signal data bit within a plurality of SD signal data transferred from the central controller in order to control the objective apparatus, and transfers simultaneously the copied SD signal data bit to the control data end units in each objective apparatus.

In another preferred embodiment, the processor access controller performs priority selection based on an apparatus number of each objective apparatus, when receiving control data transmission requests based on the DMA communication which are generated simultaneously by the plurality of objective apparatuses and are sent to the central controller, and switches the connection path in the DMA connection selector to the preferentially selected objective apparatus.

In still another preferred embodiment, each of the central controller and the processor access controller comprises a setting unit which sets a signal indicating procedures based on the DMA communication to the bit position of the fixed time slot.

In still another preferred embodiment, each of the central controller and the processor access controller comprises a transfer unit which edits the control data bit of the SD/SCN signal into a data format by attaching the CRC error correction code for each objective apparatus.

In still another preferred embodiment, each of the central controller and the processor access controller comprises a transfer unit which transfers the control data by switching alternately between a through transfer and an inversion transfer, the through transfer being performed by sending the control data with a predetermined block without any change, and the inversion transfer being performed by sending the control data after inversion, except for synchronous pattern.

In still another preferred embodiment, each of the central controller and the processor access controller comprises a setting unit which sets a fixed bit which becomes inconsistent between sequential synchronous patterns having predetermined numbers and the control data, to a particular bit position in the control data area.

BRIEF DESCRIPTION OF THE DRAWINGS

FIG. 3 is an explanatory view of a frame structure of the control data according to the present invention;

FIGS. 4 and 5 show transfer sequences based on DMA communication according to the present invention;

FIG. 6 is an explanatory view for explaining a setting accommodation position of an SD signal for broadcast and an objective apparatus for broadcast according to the present invention;

FIG. 7 is an explanatory view of interrupt control;

FIG. 8 is an explanatory view of a SONET format used in transfer of the control data;

FIG. 11 is a view for explaining assignment of bits in 16 bit parallel control data;

FIG. 12 is a view for explaining a transmission inhibiting area for the control data at the DMA communication;

FIGS. 15 and 16 are sequence charts at the occurrence of a CRC code error in the DMA communication.

DESCRIPTION OF THE PREFERRED EMBODIMENTS

Figure 17:
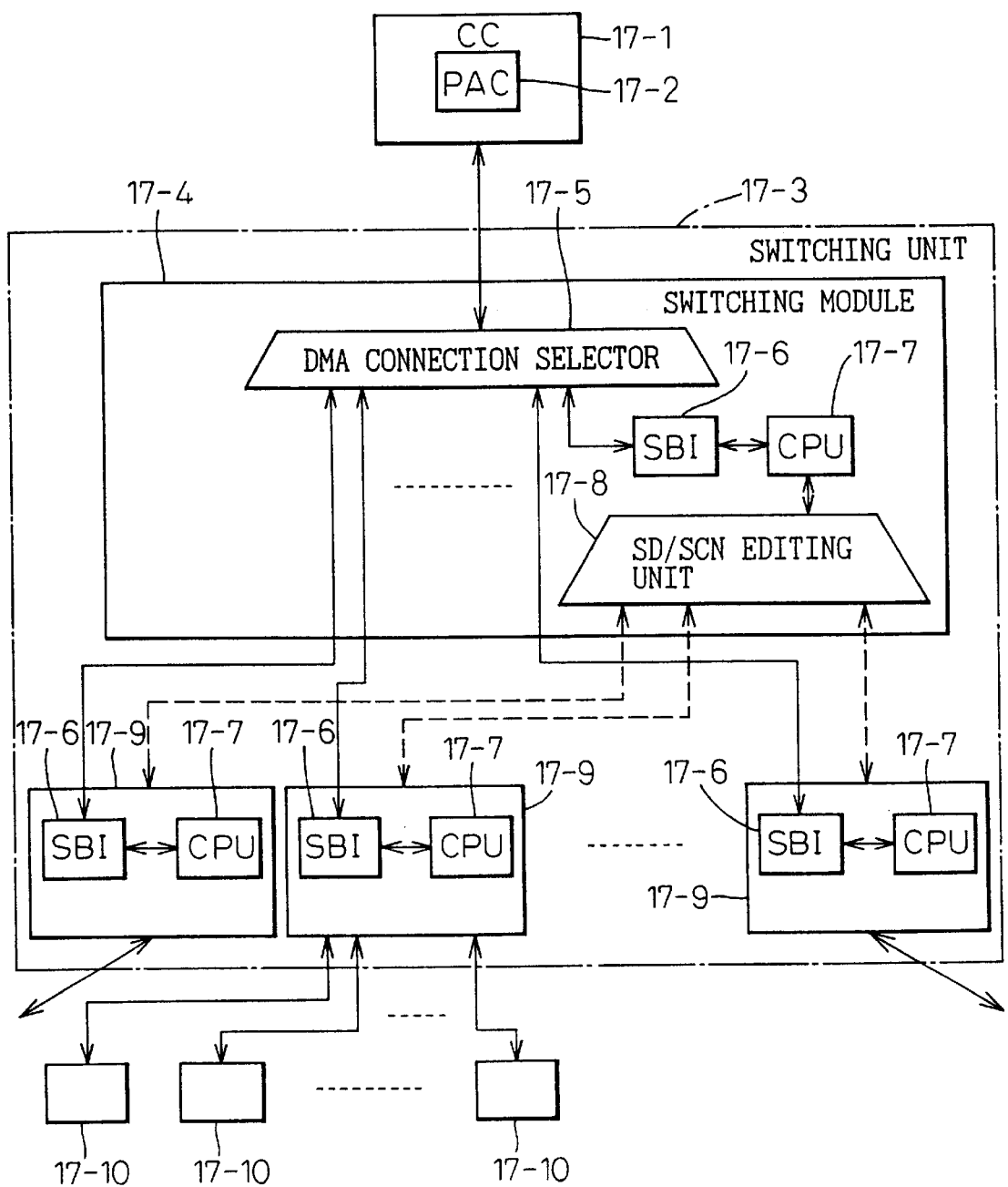
FIG. 17 is an explanatory view for explaining a switching system for controlling internal apparatuses provided within an exchange system according to an embodiment of the present invention.

FIG. 17 is an explanatory view for explaining a switching system for controlling internal apparatuses provided within an exchange system. Particularly, this drawing shows an essential part of the switching system for controlling internal apparatuses provided within an ATM exchange used in a station.

Figure 1:
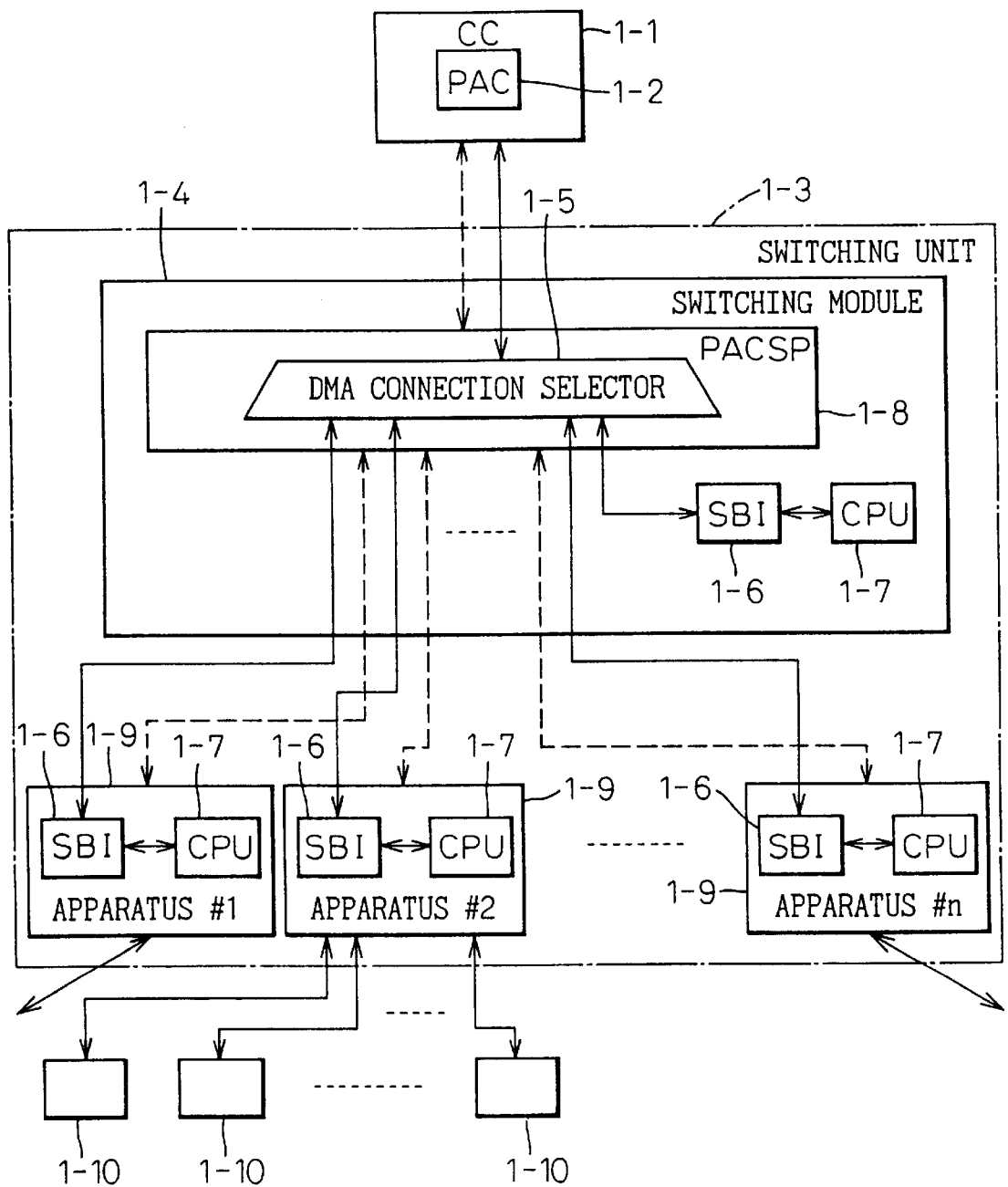
FIG. 1 is an explanatory view for explaining a switching system for controlling internal apparatuses provided within an exchange system according to an embodiment of the present invention.

In FIG. 17, 17-1 denotes a central controller (CC), 17-2 denotes a processor access controller (PAC), 17-3 denotes a switching unit, 17-4 denotes a switching module, 17-5 denotes a DMA connection selector, 17-6 denotes a plurality of system bus interfaces (SBI), 17-7 denotes a plurality of control data end units each having a computer, (CPU), 17-8 denotes an SD/SCN editing unit (SD/SCN), 17-9 denotes a plurality of objective apparatuses each of which should be controlled by the central controller, and 17-10 denotes a plurality of line interface apparatuses.

The switching unit 17-3 includes the switching module 17-4 and a plurality of objective apparatuses 17-9, and constitutes a channel unit (below, an SP-apparatus, or an SP-route). Further, the central controller 17-1 constitutes a central processing apparatus (below, a CP-apparatus, or a CP-route), and checks and controls each SP-apparatus provided within the switching unit 17-3 through the processor access controller 17-2.

The switching module 17-4 and each objective apparatus 17-9, which are provided within the switching unit 17-3, include the control data end unit 17-7 and receive and transmit control information from the central controller 17-1 to each SP-apparatus, and status information for each apparatus from each SP-apparatus to the central controller 17-1 by using the control data end unit 17-7 based on the DMA communication.

In DMA communication, data transmission and its answer are repeated in accordance with a handshake procedure by using a data transmission request signal (below, a REQ signal) and a data recognition signal (below, an ACK signal), and data packets are transferred so that data units, each having variable length, are transmitted and received.

In the SP-apparatus, data received based on the DMA communication are analyzed by the CPU provided in the control data end unit 17-7. The data transmitted based on the MA communication are edited by the CPU in the control data end unit 17-7, formed to predetermined data units, and transmitted to the central controller 17-1.

In FIG. 17, a path of signal transfer based on the DMA communication is shown by a solid line with arrows. The transfer of the control data is performed based on the DMA communication between the processor access controller 17-2 and the control data end unit 17-7 through the DMA connection selector 17-5 and the system bus interface 17-6.

In the switching unit 17-3, the SD/SCN signal, which is output from a signal distributor/scanner (not shown), is used for transferring either a signal which needs to be transferred at high speed (below, this signal is called a "high speed signal", and used for, for example, an apparatus fault information, a route switching information, etc.), or a signal which needs to notify simultaneously a common information to each SP-apparatus (below, this signal is called a "common signal", and used for, for example, a clock information, etc.).

Without any process for analyzing parameters by a processor for the control data based on the SD/SCN signal, the SD/SCN signal is set to a fixed bit position on the transmission frame, and recognized at high speed based on autonomous operation of a hardware itself in accordance with presence/absence of a bit signal at the fixed bit position Further, since the processor is not used for transmitting g and receiving the SD/SCN signal, it is possible to notify a fault to another apparatus by using the SD/SCN signal even if the processor has broken down.

In FIG. 17, a path for transferring/receiving a signal based on the SD/SCN signal is shown by a dotted-line with arrows. That is, the transmission/reception of the signal is performed based on the SD/SCN signal between the SD/SCN editing unit 17-8 and each objective apparatus 17-9 to be controlled.

In order to transfer the control data based on the SD/SCN signal between the central controller (CC) 17-1 and each objective apparatus contained in the SP-apparatus, the DMA communication between the central controller 17-1 and the control data end unit 17-7 is temporarily terminated in the control data end unit 17-7, and the control data extracted based on the DMA communication is transmitted to each objective apparatus 17-9 as the SD signal through the SD/SCN editing unit 17-8. Further, the SCN signal from the objective apparatus 17-9 is also temporarily edited in the SD/SCN editing unit 17-8 as the control data, and transferred to the central controller 17-1 based on the DMA communication using the handshake procedure.

In this case, recently, since the capacity of an exchange system has become large, for example, improvement of throughput for call processes, high speed control of apparatuses, etc., have been required in this field.

In the above method of transferring the control data based on the SD/SCN signal in accordance with the handshake procedure after termination of the DMA communication, it is very difficult to realize high speed control because of delays in various procedures in DMA communication.

Further, when a link for the DMA communication is not established between the central controller 17-1 and the control data end unit 17-7, it is impossible to transfer the control data based on the SD/SCN signal between the central controller and each objective apparatus. As a result, there is a problem in which it is impossible to perform an appropriate control for each objective apparatus based on the SD/SCN signal.

Still further, it is necessary to transfer data including various parameters, for example, path information, etc., in order to control call processes and to collect charging data, and these data are transferred in accordance with the procedures based on the DMA communication. However, since the transfer of various control data based on the SD/SCN signal to each SP apparatus and another transfer for call process information based on the DMA communication are performed by using the same handshake procedure, there is a problem in which an efficiency of data transfer becomes worse and the call process rate is not improved.

Still further, since the control data are transferred through signal lines each using a known metallic transmission cable, there are various disadvantageous points, for example, it is impossible to increase the transfer frequency to more than several tens of MHz, the above metallic transmission cable emits much radio energy to an external environment, and much emission of radio energy results in the occurrence of noise.

Accordingly, in the switching system for controlling internal apparatuses provided within the exchange system, the present invention aims to realize high speed data transfer and high reliability based on the DMA communication and the SD/SCN signal between the central controller and each objective apparatus. Further, the present invention aims to realize transfer of the control data without emission of radio energy to the external environment.

The preferred embodiments of the present invention will be explained in detail with reference to FIG. 1 to FIG. 16.

FIG. 1 is an explanatory view for explaining a switching system for controlling internal apparatuses provided within an exchange system according to an embodiment of the present invention. In FIG. 1, 1-1 denotes a central controller (CC), 1-2 denotes a first processor access controller (PAC), 1-3 denotes a switching unit, 1-4 denotes a switching module, 1-5 denotes a DMA connection selector, 1-6 denotes a plurality of system bus interfaces (SBI), 1-7 denotes a plurality of control data end units each having a computer (CPU), 1-8 denotes a second processor access controller (PACSP) in the switching module 1-4, 1-9 denotes a plurality of objective apparatuses to be controlled, and 1-10 denotes a plurality of line interface apparatuses.

The switching unit 1-3 includes the switching module 1-4 and a plurality of objective apparatuses 1-9. Further, the central controller 1-1 includes the first processor access controller 1-2, and transmits and receives the control data through the first processor access controller 1-2 and controls each SP-apparatus provided within the switching unit 1-3.

The switching module 1-4 and each objective apparatus 1-9 in the switching unit 1-3 include the control data end unit 1-7 which transfers control information from the central controller 1-1 to each SP-apparatus and status information for each objective apparatus from each SP-apparatus to the central controller 1-1 based on the DMA communication and the SD/SCN signal.

In the DMA communication, data transmission and its answer are repeated in accordance with the handshake procedure by using the data transmission request signal (a REQ signal) and the data recognition signal (an ACK signal), and data packets are transferred therebetween so that data units each having variable length are transmitted and received therebetween.

In the switching module 1-4 or the control data end unit 1-7, the data received based on the DMA communication are analyzed by the CPU provided in the control data end unit 1-7. The data transmitted based on the DMA communication are edited by the CPU 1-7, formed to predetermined data units, and transmitted to the central controller 1-1.

In FIG. 1, a path of signal transfer based on the DMA communication is shown by a solid line with arrows. The DMA communication is performed between the first processor access controller (PAC) 1-2 and the control data end unit 1-7 through the DMA connection selector 1-5 and the system bus interface 1-6.

In the switching unit 1-3, except for signal transmission and reception based on the DMA communication, the SD/SCN signal from the signal distributor/scanner (not shown) is used for transferring either the high speed signal, or the common signal which needs to notify the same signal to each SP-apparatus.

The control data based on the SD/SCN signal are recognized at high speed based on autonomous operation of a hardware itself in accordance with presence/absence of a predetermined bit signal on the transmission frame. Further, it is possible to notify a fault to another apparatus based on autonomous operation of the hardware itself even if the processor has broken down.

In FIG. 1, a path of signal transfer based on the SD/SCN signal is shown by the dotted-line with arrows. That is, the transmission and reception of the signal is performed based on the SD/SCN signal between the central. controller 1-1 and the control data end unit 1-7 of each SP-apparatus, by transferring the signal to a memory (not shown) provided in the second processor access controller (PACSP) 1-8 in the switching module and the first processor access controller (PAC) 1-2 in the central controller (CC) 1-1.

The second processor access controller 1-8 in the switching module 1-4 and the first processor access controller 1-2 in the central controller 1-1 are connected each other through optical fiber cables, and the transfer of the control data is performed based on the DMA communication and the SD/SCN signal by using an optical signal having transmission rate of 155.52 Mbits/s.

Figure 2:
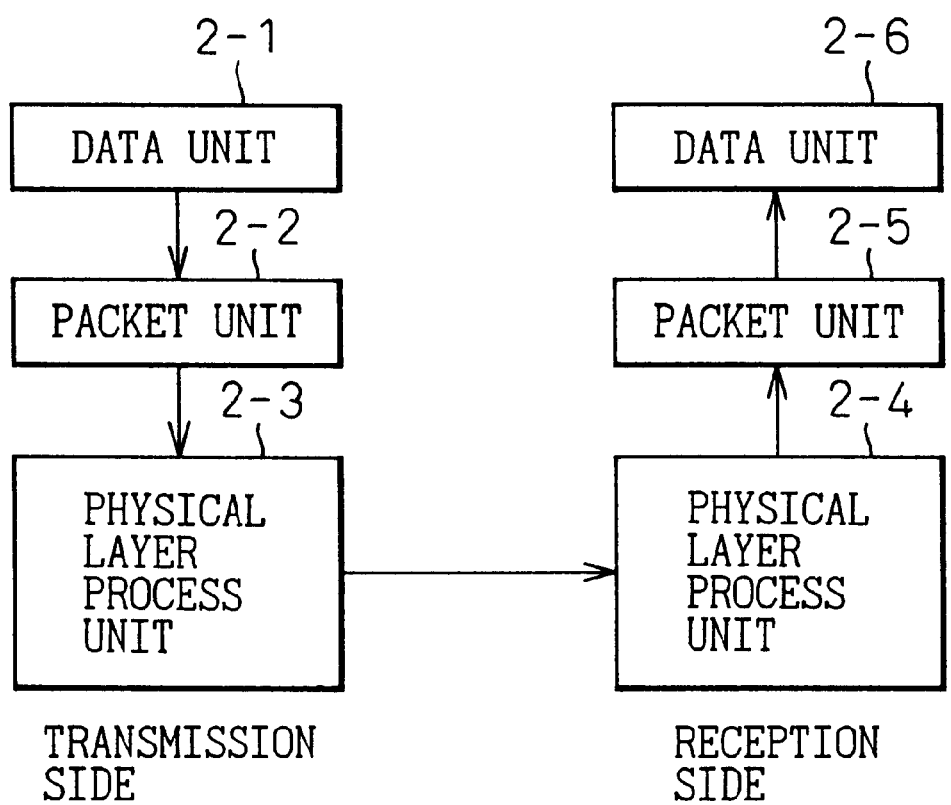
FIG. 2 shows a layer structure of control data according to the present invention.

FIG. 2 shows a layer structure of the control data according to the present invention. In the transmission side, a data unit 2-1 includes the control data to be used in the DMA communication, and is divided into packet data each having a predetermined length. Further, a header is added to the top of the packet data, and a tail portion is also added to the end thereof so that one packet unit is formed (see FIG. 3). Further, the packet unit 2-2 is converted to an optical signal in a physical layer process 2-3, and the optical signal is transmitted to the reception side.

In the reception side, the optical signal is converted to an electric signal in a physical layer process 2-4, and the packet unit 2-5 is reformed. Further, the data unit 2-6 is edited from the packet unit 2-5. Further, the control data of the data unit 2-6 is delivered to various control functions in an upper layer, and various controls of the exchange are performed based on the control data.

The data units 2-1 and 2-6 are proper control data provided in the system itself in order to control the exchange system operated by a predetermined software or a predetermined function of firmware, and are delivered from various function units in the transmission side to various function units in the reception side.

The packet units 2-2 and 2-5 are structures of data frames which are transmitted and received between the SP-route and the CP-route. Each of the data units 2-1 and 2-6 is subdivided, and each of the packet units 2-2 and 2-5 is prepared in order to effectively utilize resources of the communication (see FIG. 3). The packet unit is processed by the hardware.

The physical layers 2-3 and 2-4 transmit the packet units 2-2 and 2-5 using the optical signal in accordance with formats similar to transmission formats of SONET or SDH based at the transmission rate of 155.52 Mbits/s.

FIG. 3 is an explanatory view of a frame structure of the control data according to the present invention. (A) shows the control data, (B) shows the data unit, and (C) shows the packet unit. The control data is the data for controlling the exchange system, and is transmitted and received between the SP-apparatus and the central control apparatus (CC). Further, the header 3-1 is added to the control data so that the data unit is formed. Still further, the data unit is subdivided, and each subdivided data unit is called "packet unit". Then, the header 3-2 is added to the top of each packet unit, and the tail portion 3-3 is added to the end (i e., tail portion) of each packet unit.

FIGS. 4 and 5 show transfer sequences based on the DMA communication according to the present invention. In FIG. 4, briefly, the control data is transferred from the first processor access controller (PAC) 1-2 in the central controller (CC) 1-1 to the control data end unit in the switching module 1-4 or in the objective apparatus (AIF/TCSW), through the second processor access controller (PACSP) 1-8 in the switching module 1-4 (see FIG. 1).

As shown in FIG. 4, the first packet unit (REQ Packet) including the transmission request (REQ) is sent from the first processor access controller (PAC) to the second processor access controller. (PACSP) in the switching module (4-1). The second processor access controller (PACSP) stores the first packet unit (REQ/Packet) in a buffer (not shown), switches the DMA connection selector in accordance with a path number contained in the packet unit, and sends the first packet unit to the destination of the path number (4-2). In this case, only the first packet unit is stored in the buffer, and the following packet units are transferred through the buffer.

In the control data end unit in the reception side, the normality of the packet unit is checked by the CRC provided in the tail portion thereof. When the next packet unit becomes the reception state, the control data end unit sends the ACK signal to the processor access controller (PAC) (4-3). In accordance with repetition of the above sequences, the following packet units (i e., after the second packet) are transferred (4-4, 4-5) until the last packet unit is transferred.

In the transmission-side, a flag (LAST) is added to the header of the last transmission packet (REQ/Packet (LAST)). This flag indicates that this packet unit is the last (4-6). The reception side recognizes completion of transfer of the data unit based on this flag. When the transmission is completed normally, the reception side sends the ACK signal to the transmission side.

On the other hand, when an abnormal reception (for example, a CRC error) occurs in the reception side, the reception side sends a BUSY signal (ACK/BUSY) (4-7), and further sends the transfer completion signal (ENDF) of the data unit to the processor access controller (PACSP) (4-8). When the processor access controller (PACSP) receives the ENDF signal, it releases the selected path in the DMA connection selector, and changes to waiting state for next DMA communication.

In FIG. 5, the data transfer is performed from the control data end unit in the SP-apparatus to the central controller (CC). The request for the data transfer occurs asynchronously from nine control data end units which are the maximum. Accordingly, the processor access controller (PACSP) in the switching module must mediate competition between requests which are generated simultaneously.

It is assumed that the first packet unit including the transmission request (REQ) is sent simultaneously from the control data end unit in the switching module (TCSW) and the control data end unit in the objective apparatus (AIF), to the processor access controller (PACSP) in the switching module (5-1, 5-2).

At that time, the processor access controller (PACSP) performs a priority process in which, for example, the SP-apparatus having a younger number becomes preferential, and selects the path in the DMA connection selector to the SP-apparatus selected preferentially. Further, the processor access controller (PACSP) sends the BUSY signal, which indicates the rejection of request based on the DMA communication, to another SP-apparatus in which the request was rejected (5-3).

Further, as a method of mediating competition of the request of the data transmission, the processor access controller (PACSP) temporarily stores the DMA transmission request packet (for example, eighteen bytes from the head) sent from the objective apparatus 1-9. Then, as a result of mediation, the processor access controller (PACSP) sends the packet, which was sent from the objective apparatus mediated, to the processor access controller (PAC) 1-2 in the central controller (CC) 1-1, and starts the DMA communication for the designated path. On the other hand, the processor access controller (PACSP) does not return any answer to the SP-apparatus in which the request was rejected, and sets the rejected SP-apparatus to waiting state. When the path is released, the request from the rejected SP-apparatus is sent to the central controller 1-1.

In FIG. 5, the first packet unit. (REQ/Packet) from the control data end unit which is included in the preferentially selected SP-apparatus, is sent to the processor access controller. (PAC) 1-2 in the central controller. (CC) (5-4). The processor access controller (PAC) 1-2 checks the normality of the packet unit in accordance with the CRC code provided in the tail portion, and sends the ACK signal to the control data end unit in the switching module (TCSW) when the next packet unit is set to the reception state (5-5). In accordance with repetition of the above steps, the packet is transferred until the last packet unit is transferred (5-6, 5-7).

At the time when the last packet is transferred, the packet including the flag (LAST) which indicates the last packet, is sent from the switching module (TCSW) to the processor access controller 1-2,(5-8). The processor access controller (PAC) 1-2 recognizes completion of transfer of the data unit based on the flag (LAST).

When the transfer of the data unit is normally completed, the processor access controller. (PAC) 1-2 in the central controller (CC) sends the ACK signal to the switching module (TCSW). On the other hand, when an abnormal reception (for example, a CRC error) occurs in the reception side, the processor access controller (PAC) 1-2 sends the BUSY signal to the switching module (TCSW) (5-9). The control data end unit in the SP-apparatus in the transmission side sends the transfer completion signal (ENDF) of the data unit to the processor access controller (PACSP) 1-8. Since the operations in the processor access controller (PACSP) 1-8. based on the ENDF signal are the same as the data unit . transfer from the central controller to the SP-apparatus, the detailed explanations are omitted.

Next, the transfer of the control data based on the SD/SCN signal will be explained in detail below. The transfer of the SD/SCN signal is performed based on autonomous operation of the hardware itself. Accordingly, even if a fault occurs in the software, the SD/SCN signal can be transferred based on the autonomous operation of the hardware itself so that it is possible to perform status control for a short time for each SP-apparatus in order to process the fault, and to continue. the communication service when the fault occurs.

In the case that the CP-apparatus controls the SP-apparatus, there are many kinds of control data to be transmitted and received between the SP-apparatus and the CP-apparatus in the ATM exchange system. For example, as the control data which should be processed within a predetermined time, there are path setting data, charging data, and data used for performance monitor/network data collection (PM/NDC). Further, there is data for checking and controlling as the control data which are transmitted and received irregularly and urgently when the fault occurs. Still further, there are a few data in which high speed is required, for example, status setting data in the SP-apparatus.

As is obvious from the above various control data, in the present invention, the DMA communication is employed when much information should be processed, and the SD/SCN signal is employed when a little data should be processed with high speed. Using selectively the DMA communication and the SD/SCN signal, it is possible to transfer the control data with effective and high speed.

In the case that the CP-apparatus controls the SP-apparatus, and when the fault occurs in the DMA communication, there are problems in which the SP-apparatus cannot be controlled, and recovery process for, the fault cannot be done by using only the DMA communication. In order to solve the above problems, the present invention includes a structure in which the transfer of the control data is performed based on the SD/SCN signal using a mechanism formed by the hardware which is provided separately from the DMA communication.

Processes performed in the CP-apparatus concern control instructions to the SP-apparatus and status checking of the SP-apparatus, and it is necessary to provide two way data communication in order to transmit and confirm the control data and to receive collected information from the objective apparatus. Accordingly, an interface between the CP-apparatus and the SP-apparatus is formed as full duplex.

On the other hand, in a conventional art, when the fault occurs on the transfer route of the control data, it is very difficult to follow and determine cause of the fault, i e., whether it is caused by the fault of the hardware on the DMA communication, or it is caused by the fault at the processes on the software or firmware. As a result, the contents to be started in a control function unit, which controls status of the apparatus in order to continue communication service in the SP-apparatus, become unclear so that the operation of the system became unstable.

In the present invention, as explained above, the DMA communication procedures are not used for the data transfer based on the SD/SCN signal. On the other hand, a status control function and an SD/SCN signal transfer function, which are performed based on autonomous operation of the hardware itself, are applied to the switching system for controlling internal apparatuses provided within the exchange system.

The SD/SCN signal according to the present invention is used as the control data which is transferred in order to directly control the software control function unit and the objective apparatus. The SD/SCN signal is used in common for all apparatuses, as well as fault processing information, in order to process the fault (for example, change of system structure), route setting information necessary for changing the system structure, or clock setting information. Further, the SD/SCN signal is used for the transfer of the control data when the difference in transfer time is very small. The propagation delay of the SD/SCN signal is set within approximately 1 ms or less, including the process time for data protection.

The SD signal includes the control data which performs route switching control and apparatus disconnecting control, and the SCN signal includes fault detecting information and faulty apparatus identifying information. The bit setting of the SD/SCN signal is performed based on the control sequence.

Further, the SD/SCN signal is transferred periodically based on autonomous operation of the hardware itself, without use of the handshake procedure, from a memory of the processor access controller (PAC) in the central controller (CC) to the objective apparatus, or from the objective apparatus to the memory of the processor access controller (PAC) in the central controller (CC).

FIG. 6 is an explanatory view for explaining the setting accommodation position of the SD signal for broadcast and the objective apparatus for broadcast according to the present invention.

The transfer of the SD/SCN signal in the processor access controller (PAC) and the objective apparatus (TCSW, AIF) is explained in detail with reference to FIG. 6. In this case, the SD signal is a signal which is transferred from the processor access controller (PAC) in the central controller (CC) to the objective apparatus, and the SCN signal is a signal which is transferred from the objective apparatus to the processor access controller (PAC) in the central controller (CC).

When the processor access controller (PAC) in the central controller (CC) receives the bit "1" of the SCN signal from the objective apparatus, the processor access controller (PAC) generates an interrupt to the microprocessor bit-by-bit. In this case, the display of the interrupt is performed for each objective apparatus (total 9 points). An interrupt mask is performed for each objective apparatus bit-by-bit.

Further, the interrupt mask is performed in accordance with change of the SCN signal. There are two kinds of interrupts based on the SCN signal. That is, one is in the case that a fault recovery notice (for example, power disconnection at another apparatus on another route) is required, and another is in the case that the fault recovery notice is not required. In this case, the fault recovery notice is performed based on the DMA communication.

Further, the processor access controller (PAC) sets the bit of the SD signal for each objective apparatus, and sends the SD signal to the objective apparatus. In this case, it is possible to broadcast the control data (i.e., send the control data all at once), for example, various kinds of time set (i.e., one day, one hour, a quarter), a notice of level of restarting, a hardware reset (HRST)/micro processor reset (PRST) fault reset (FRST), etc. The bit accommodation of these control data is prepared independently either in the case of the broadcast, or in the case of individual setting of apparatus, and can be selected and set in the user's side (in software).

The objective apparatus notifies various status of the apparatus to the central controller (CC) based on the SCN signal, and transmits an echoback for confirming an arrival of the SD signal sent from the central controller. (CC), based on autonomous operation of the hardware itself. Further, in the transmission of the echo-back, it is possible to recognize the SD signal in the firmware function, and to set the echo-back to the SCN signal after predetermined processes.

When the change occurs in the incoming SD signal, the objective apparatus generates the interrupt to the microprocessor bit-by-bit, and performs the interrupt mask due to the change of the SD signal bit-by-bit. The SD signal includes a bit-by-bit masking function. The masking function is provided for excluding not-used bits. from the object of interrupt, since used bits or not-used bits-exist in the SD signal in dependent on the apparatus itself or the status thereof.

The processor access controller (PACSP) in the switching module (TCSW) includes a copy function which copies the data, which is set to the particular bit of the SD signal sent to the control data end unit, to the particular bit of the SD signal sent to the objective apparatus, in order to broadcast the control data. The setting accommodation position of the SD signal for broadcast (BSD) and the objective apparatus for broadcast. are shown by BMSD setting position in FIG. 6, as one example.

Regarding the hardware reset (HRST)/microprocessor reset (PRST)/fault reset (FRST)/processor access controller sequence reset (PACRST), since it is possible to separately set the above resets to each apparatus, the processor access controller (PACSP) in the switching module temporarily and separately stores the SD signal, and takes a logical sum with the SD signal for broadcast, and sends it to the objective apparatus.

At that time, the CRC code of the SD signal sent to the objective apparatus should be re-calculated, and the re-calculated CRC code must be re-attached to the SD signal. In this case, when the received SD signal which is sent to the control data end unit of the switching module includes the CRC error, the SD signal is treated as an invalid signal "L".

When the SD signal which is sent to the control data end unit, is normal, the bit of the SD signal for broadcast is taken into the objective apparatus. On the other hand, when the SD signal includes the CRC error, the SD signal for broadcast is copied normally to the objective apparatus. In this case, the CRC code of the SD signal, which is sent from the processor access controller (PACSP) to the objective apparatus, is reattached in the processor access controller (PACSP) so as to become the CRC error.

When all fault processes are performed based on the transfer of the SD/SCN signal, all processes can be controlled in the software function. That is, display of the fault required in fault processes, such as, fault checking instructions, fault informing instructions, etc., regarding the fault of the switching module (TCSW) or the fault of the objective apparatus (AIF), can be performed based on the transfer of the SCN signal.

Accordingly, in the side of the processor access controller (PAC) in the central controller (CC), if the mask of the SCN signal is performed in accordance with status of the apparatus, it is not necessary to set the fault checking instructions and the fault notifying instructions to the objective apparatus. The objective apparatus detects all faults and notifies them to the central controller based on the SCN signal, and the upper software function in the central controller (CC) extracts only necessary fault information.

Since the interrupt due to reception of the SCN signal in the side of the processor access controller (PAC) and the interrupt due to reception of the SD signal in the side of the objective apparatus occur irregularly, an interrupt request due to different causes becomes competitive. Accordingly, the interrupt control is performed by detecting an interrupt priority level.

FIG. 7 is an explanatory view of the interrupt control. In FIG. 7, (A) denotes the interrupt due to a main cause SCN-a, (B) denotes the interrupt due to the main cause SCN-b, and (C) denotes the interrupt due to the main cause SCN-c. Further, (D) denotes the interrupt to the processor access controller (PAC), and (E) denotes the interrupt to the CPU.

In the interrupt to the CPU shown in (E), the interrupt due to the main cause SCN-a occurs at the time t1, and the main cause of the fault is recognized by reading the SCN signal. After the above process, the interrupt due to the main cause SCN-b occurs, and the main cause of the fault is recognized by reading the SCN signal. Further, the interrupt mask due to the main causes SCN-a and SCN-b is performed at the time t2, and the interrupt due to the main cause SCN-c occurs at the time t3.

FIG. 8 is an explanatory view of a SONET format used in the transfer of the control data.

The transfer of the control data using the SONET format is explained in detail below. When an optical serial link at 155.52 Mbits/s is used as an interface of the processor access controller (PAC), a random characteristic is required for data signal so that a direct current balance of the transmission data signal becomes approximately 50% in order to execute clock recovery and to realize frame synchronization of the SONET format in the reception side.

As shown in FIG. 8, the SONET format accommodates synchronous patterns A1 and A2 formed by six bytes (each of A1 and A2 has one byte) in one frame formed by 270 octet (OCT)×9 rows, and the frame is recognized based on the synchronous patterns. Accordingly, actually, the number of bytes which can be used for the transfer of the control data is given by 2424 bytes (270×9−6=2424) per one frame.

Figure 9:
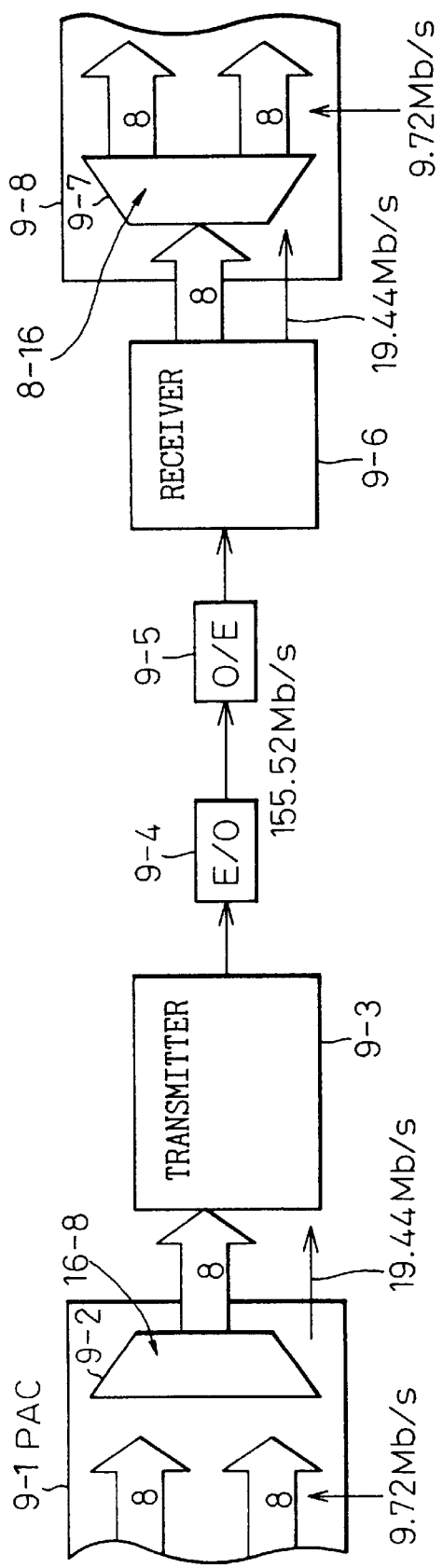
FIG. 9 is an explanatory view of a transmission unit and a reception unit used for the control data according to the present invention.

FIG. 9 is an explanatory view of a transmission unit and a reception unit used for the control data according to the present invention. The drawing shows the transfer of the control data from the processor access controller (PAC) 9-1 in the central controller (CC) to the control data end unit 9-8 in the objective apparatus. In this case, the transfer of the control data from the control data end unit 9-8 to the processor access controller (PAC) 9-1 is performed in the same way as the above.

The processor access controller (PAC) 9-1 converts the control data having sixteen bits (9.72 Mbits/s) to the data (19.44 Mbits/s) having eight bits (i e., one byte) in a 16 to 8 parallel converter 9-2. Further, the data is formed to the SONET format (155.52 Mbits/s) having serial bits in a transmitter 9-3, and the SONET format is converted to an optical signal in an electric-optical converter (E/O) 9-4 and sent to the reception unit.

In the reception side, the optical signal is converted to the electrical signal in an optical-electric converter (O/E) 9-5, and the data having eight bits (i e., one byte, below, 8-bit data) is extracted from the SONET format in a receiver 9-6. Further, two sets of 8-bit data are provided by a 8 to 16 parallel converter 9-7 so that the control data having sixteen bits is edited.

Figure 10:
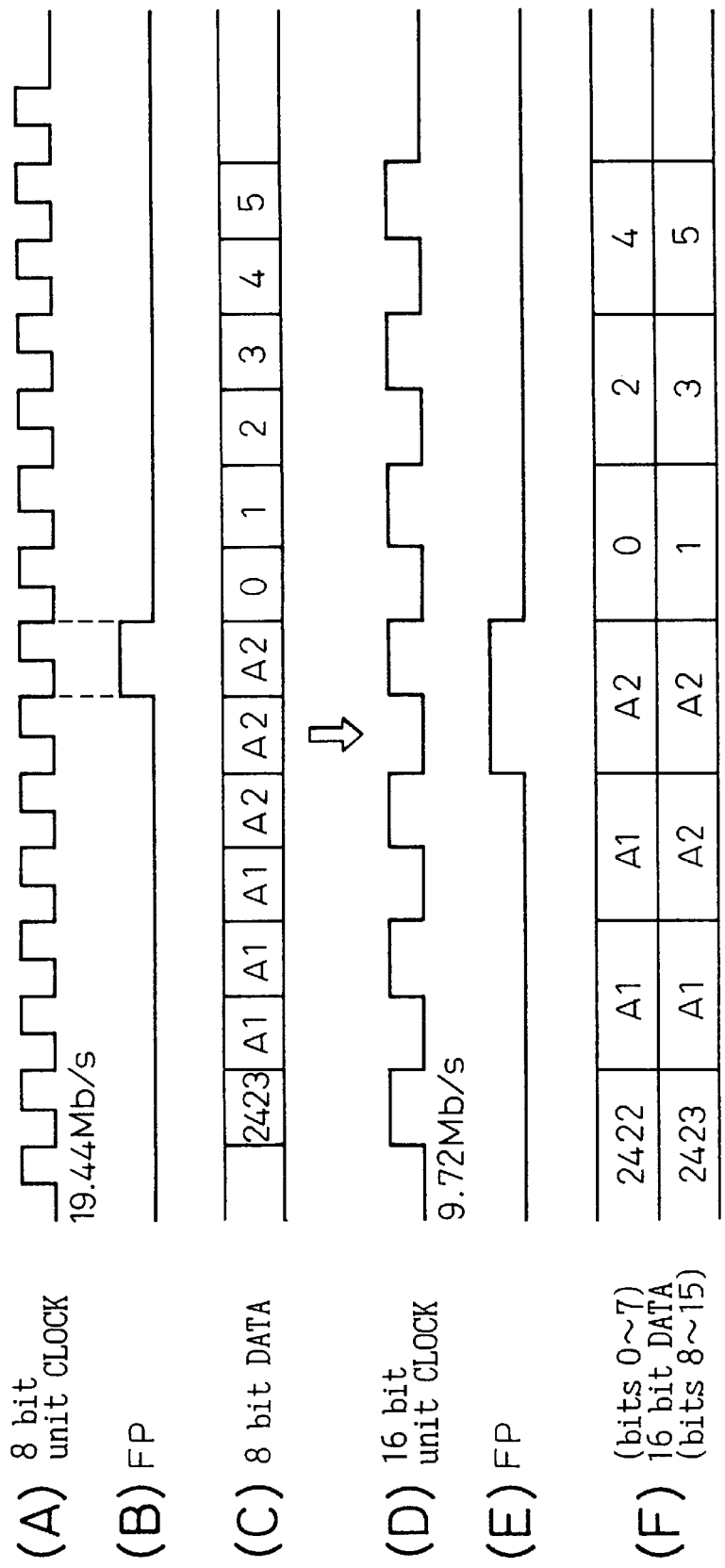
FIG. 10 is a timing chart of transmitting and receiving the control data according to the present invention.

FIG. 10 is a timing chart for transmitting and receiving the control data according to the present invention. The timing chart (A) denotes a clock signal (19.44 Mbits/s) generated for every eight bits (i e., one byte) (see 8 bits unit clock). The timing chart (B) denotes a frame pulse (FP) which is output when detecting the synchronous patterns A1 and A2. The timing chart (C) denotes an arrangement of the control data (0 to 2423 show the number for each byte) and the synchronous patterns A1 and A2, for every eight bits data.

Further, the timing chart (D) denotes another clock signal (9.72 Mbits/s) generated for every sixteen bits (see 16 bits unit clock), the timing chart (E) denotes another frame pulse (FP) which is output when detecting the synchronous patterns of sixteen bits, and the timing chart (F) denotes the control data each having sixteen bits (i e., two bytes) (see 16 bits data). As shown in the timing chart (F), in the 16 bits control data, an even number (see 2422, 2, 4, etc.,) is assigned to bits 0 to 7, and an odd number (see 2423, 1, 3, 5, etc.,) is assigned to bits 8 to 15.

FIG. 11 is a view for explaining assignment of bits in the 16 bits parallel control data. As shown in the drawing, each of bits No. 0 to No. 7 is assigned to data bit used for the DA communication, the bit No. 8 is assigned to a bit for preventing erroneous recognition of the synchronous pattern (SYNC), the bit No. 9 is assigned to a bit for indicating transmission request (REQ), the bit No. 10 is assigned to a bit for indicating request recognition (ACK), the bit No. 11 is a bit for indicating the present system (ACT), the bit No. 12 is assigned to a bit for indicating busy state (BUSY), the bit No. 13 is assigned to a bit for indicating a first SD signal (SD0) or a first SCN signal (SCN0), the bit No. 14 is assigned to a bit for indicating a second SD signal (SD1) or a second SCN signal (SCN1), and the bit No. 15 is assigned to a bit for indicating reset of sequence of the processor access controller (PAC).

Since the synchronous patterns A1 and A2 are set to six bytes before the frame pulse FP, the control data cannot be set in these area. However, the request for data transmission at the DMA communication always occurs regardless of the above transfer timing of the SONET frame. Accordingly, it is necessary to perform the timing control for data transmission at the DMA 27 communication as explained in detail below.

FIG. 12 is a view for explaining a transmission inhibiting area for the control data at the DMA communication. This chart shows transmission/reception timing based on the clock signal generated for every sixteen bits. Further, one packet unit at the DMA communication has eighteen bytes including the header and the tail portion for CRC.

The timing chart (A) denotes the frame pulse FP, the timing chart (B), denotes an area which provides the synchronous patterns (A1, A2) (3 CK), and the timing chart (C) denotes the transmission timing of the control. data. As shown by the chart (B). (see E and F in FIG. 10), since the synchronous patterns (A1, A2) are set in three clocks (3 CK) before the frame pulse FP, this area (slant limes) is determined as a transmission inhibiting area of the DMA data at the DMA communication.

Further, in the transmission side, it is assumed that, when N bytes within one packet unit of the DMA 220 communication are transmitted, N bytes reaches the data transmission inhibiting area at the DMA communication. In this case, next byte is set to waiting state, and after the frame pulse FP, the packet units including the remaining bytes (i e., 18 bytes–N bytes) are transferred. Regarding the REQ, ACK and ACT.(see FIG. 11), the data at the area of the synchronous patterns are neglected and the just before data is held in the reception side.

Regarding the SD/SCN signal, it is possible to transfer the SD/SCN signal of 2424 bits within one SONET frame, by using 2 within 16 bits control data. The SD/SCN is a,real time signal which is sequentially sent, and is not formed as a multiframe structure in order to realize quick response of the signal transfer and to simplify transfer process. It is required that the SD/SCN signal bits for the control data en d units in the maximum nine apparatuses are included within one SONET frame.

Figure 13A:
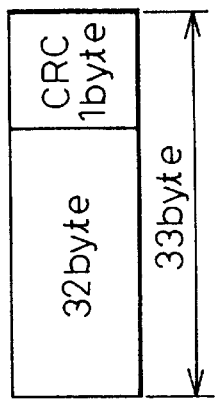
FIGS. 13A and 13B are views for explaining frame structures of the SD/SCN signal according to the present invention.
Figure 13B:
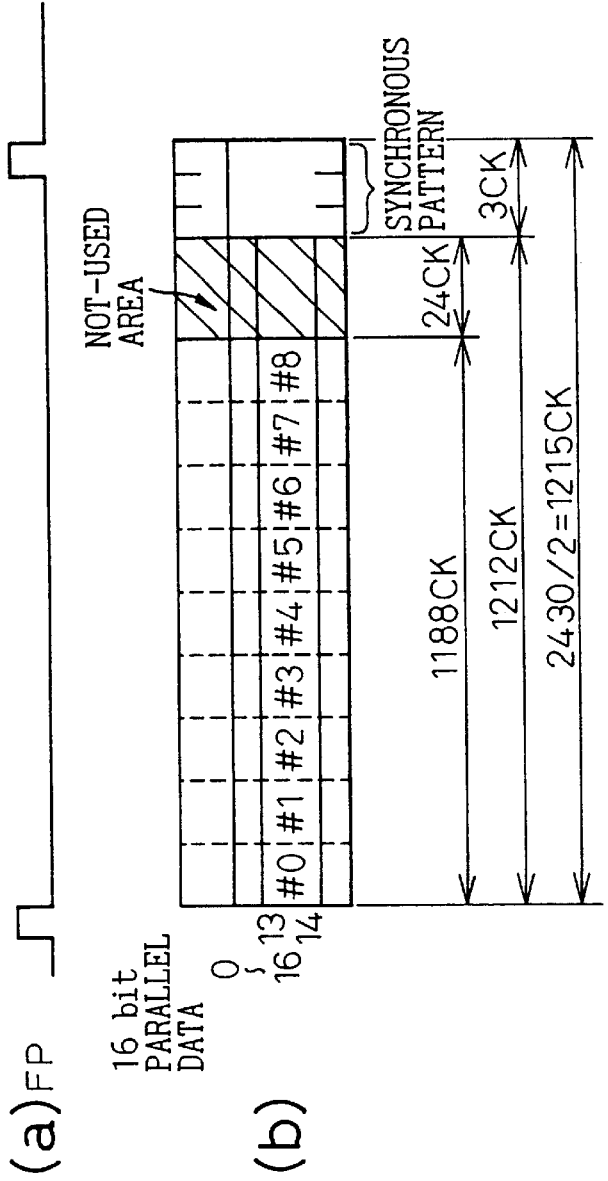

FIGS. 13A and 13B are views for explaining frame structures of the SD/SCN signal according to the present invention. FIG. 13A shows a frame format of the SD/SCN signal per one unit, and the frame format is formed by 33 bytes including data of the SD/SCN signal having 32 bytes per one unit and a CRC code having one byte.

There are nine control data end units, which are the maximum, in the objective apparatus including the switching module, and the number of bits of the SD/SCN signal for all control data end units become 2376 bits (33×9×8=2376). Accordingly, within 2430 bytes clock at one frame of the SONET, 2376 bytes clock are assigned as valid SD/SCN signal data, the remaining 54 bytes clock (2430−2376=54) is set to a not-used portion, so that it is possible to assign bits so as to contain the SD/SCN signal bits into one SONET frame.

FIG. 13B is an explanatory view for explaining the structure of the SD/SCN signal in the SONET frame according to the present invention. In this case, this drawing is shown by a 16 bit unit clock. (a) shows the frame pulse FP, and (b) shows 16 bit parallel control data. The SD/SCN signal is set to bits of No. 13 and No. 14 from the frame pulse FP to the clock of No. 1188. Further, not-used 54 bytes clock are given by 27 clocks for a 16 bit unit clock, three clocks therein are assigned to the synchronous pattern and the remaining 24 clocks become a not used area. In the drawing, each of #0 to #8 shows a time slot which is assigned to nine apparatuses.

One SONET frame is transferred in 125 µs/one period. Accordingly, the SD/SCN signal is refreshed every 125 µs so that it is possible to set or extract data bits of the SD/SCN signal from the bit position based on the above frame pulse, and it is not necessary to detect the frame synchronous pattern in order to transfer the SD/SCN signal.

Figure 14A:
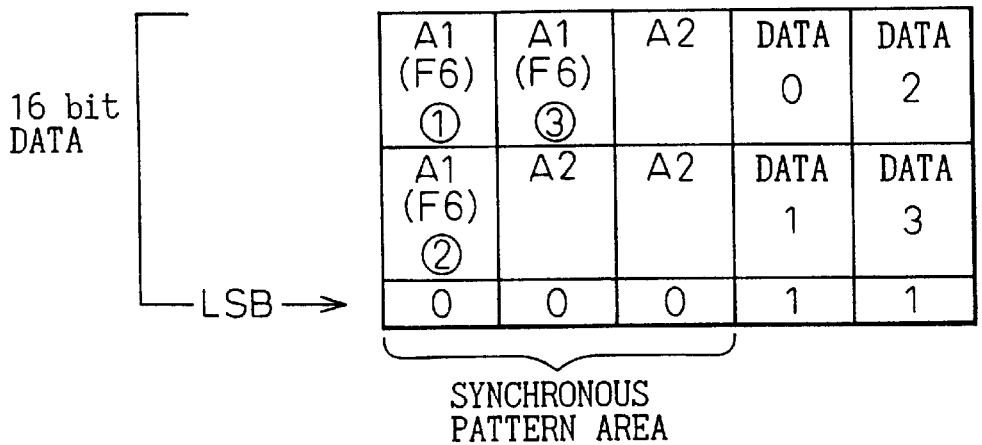
FIGS. 14A and 14B are views for explaining prevention of erroneous recognition of a synchronous pattern and direct current balance when transferring the control data according to the present invention.
Figure 14B:
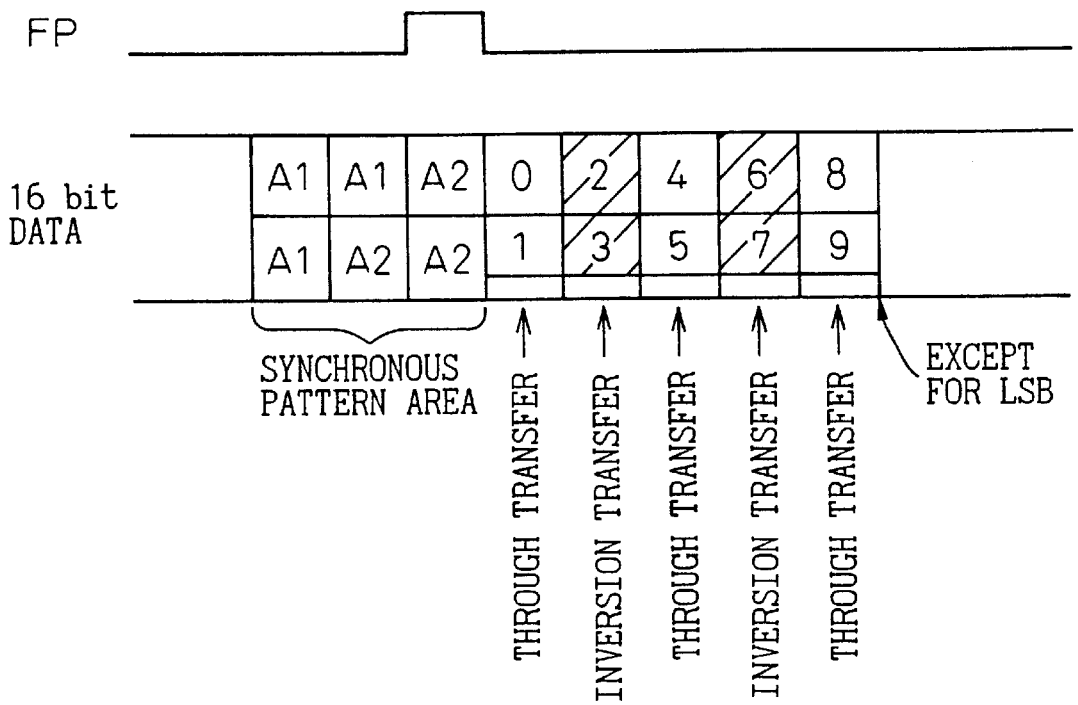

FIGS. 14A and 14B are views for explaining prevention of erroneous recognition of the synchronous pattern and direct current balance when transferring the control data according to the present invention. The frame synchronous in the receiver is detected by continuous three times reception of an "F6" (h) pattern at A1 byte and a "28" (h) pattern at A2 byte. Accordingly, it is necessary to process these patterns so as not to occur in the transmission data. The control data is transmitted and received as a 16-bit parallel signal. In this case, 15 bits within 16 bits are used as valid data, and remaining one bit is used as a prevention bit of erroneous recognition for the synchronous pattern.

On the SONET, the bit No. 8 becomes a least significant bit (LSB), and the prevention bit of the erroneous recognition is assigned to the LSB as shown in FIG. 14A. Regarding the data area, it is very difficult to determine what kinds of signal patterns are transferred except for the LSB. The LSB at the area of the synchronous pattern is always "0" (see FIG. 14A). Accordingly, the LSB except for the synchronous pattern area is set to "1" (see FIG. 14A). Accordingly, the pattern of "F6" (h) at the A1 byte does not occur three times continuously in the data area.

Regarding the direct current balance of the transfer data, it is necessary to analyze the data of the DMA communication and the data pattern of the SD/SCN signal. In this case, to transmit continuous pattern of "FF" (h) and "00" (h) byte-by-byte includes very low probability because of data structure. Further, the REQ and ACK signals are transferred using the handshake procedure, and processed as the level signal.

Based on the above-mentioned characteristics, as shown in FIG. 14B, "through transfer" and "inversion transfer", are alternately performed when transferring the data. In the "through transfer", the data is transferred in the form of the original data for every clock (16 bits unit clock). On the other hand, in the "inversion transfer", the data is transferred by inverting the original data. As a result, it is possible to realize a mark ratio of approximately 50%. In this case, the LSB at the synchronous pattern and the data area is not inverted.

Next, a countermeasure against the fault in the interface of the processor access controller (PAC) is explained in detail below. Since the optical link is used for the interface of the processor access controller (PAC), a bit error occurs in a predetermined probability on the transmission line. The fault due to temporary bit error is recovered based on the abnormal detection process in the processor access controller (PAC), and the DMA communication is performed normally based on a request of retransmission. In this case, it is assumed. that the bit errors occur one by one and do not occur continuously as two bits or more in the following explanation.

The selection of path in the processor access controller (PACSP) in the switching module becomes a through state until the first packet unit is received after the waiting state of the path in upstream and in downstream, and the ENDF signal reaches from the control data end unit after the DMA connection selector is locked. During the through state, the transfer sequence is not performed to the processor access controller (PAC).

The path recognition at the processor access controller (PACSP) is performed by confirming normality of the CRC code in the first packet unit. If the CRC code is normal, the path is selected based on the address which is set into the first packet unit. When an error is checked in the CRC code, that packet unit is sent to the control data end unit in the switching module.

ACK, BUSY and ENDF signals are output with four-bit width by taking account occurrence of bit errors. In the reception side, these signals are recognized with a two-bit width. Accordingly, a single bit error is not recognized as an error. Since the REQ signal takes the packet unit (16 bytes) at the leading edge of two-bit width, the CRC code error of the packet unit occurs only when the head of the REQ signal is lost due to a bit error.

Based on the above conditions, occurrence of the fault at the interface of the processor access controller (PAC) and a countermeasure thereof are explained in detail below.

The following explanation is in the case of occurrence of bit error at the first packet unit at the DMA communication from the processor access controller (PAC) to the control data end unit.

In this case, when the CRC code error due to bit error is detected by the processor access controller (PACSP) in the switching module, the processor access controller (PACSP) sends the first packet unit to the control data end unit in the switching module without any conditions. The control data end unit in the switching module detects the CRC code error, and returns the CRC code error to the processor access controller (PAC).

The following explanation is for the case when the bit error occurs, except for the first packet unit, and it becomes the CRC code error at the DMA communication. In this case, in both ways, i e., in the upstream and in the downstream, the CRC code error is returned from the processor access controller (PAC) or the control data end unit.

The following explanation is in the case that the request at the DMA communication is sent to a network highway (NHW) which is not connected.

In this case, the processor access controller (PACSP) in the switching module switches the DMA connection selector to the path when the first packet unit is normal. However, since the objective apparatus is not connected to the DMA connection selector, sequence stack occurs. In this case, the sequence stack is recovered by the PAC sequence reset on individual line. Further, when the PAC sequence reset is input to the control data end unit, the ENDF signal is sent from the control data end unit regardless of DMA communication.

FIGS. 15 and 16 are sequence charts at the occurrence of the CRC code error in DMA communication. FIG. 15 is in the case of occurrence of the CRC code error in the DMA communication from the processor access controller (PAC) in the central controller (CC) to the control data end unit in the objective apparatus (AIF/TCSW), and FIG. 16 is in the case of occurrence of the CRC code error in the DMA communication from the control data end unit to the processor access controller (PAC).

In FIG. 15, when the CRC code error occurs in the transmission request packet unit (REQ/Data) sent from the processor access controller (PAC) in the central controller (CC) (15-1), the processor access controller (PACSP) in the switching module connects the DMA connection selector to the control data end unit in the switching module without any conditions when the transmission request packet unit. (REQ/Data) is the first packet unit, and sends the first packet unit to the control data end unit in the switching module (15-2).

On the other hand, when the transmission request packet unit (REQ/Data) is not the first packet unit, the processor access controller (PACSP) sends the transmission request packet unit (REQ/Data) to the control data end unit of the destination of the path (15-2).

The control data end unit in the objective apparatus (AIF/TCSW) detects the CRC code error of the transmission request packet unit (REQ/Data), and returns the ACK/BUSY signal to the processor access controller (PAC) (15-3). Further, the control data end unit in the objective apparatus (AIF/TCSW) sends the ENDF signal to the processor access controller (PACSP) in the switching. module (15-4).

The processor access controller (PACSP) in the switching module returns to the waiting state when receiving the ENDF signal, the processor access controller (PAC) in the central controller (CC) executes abnormal detection process, sends the individual PAC sequence reset signal to the control data end unit in the objective apparatus (AIF/TCSW) (15-5), and sends again the transmission request packet unit (REQ/Data) (15-6). In this case, when the CRC code error occurs due to an abnormal length of the transmission request signal (REQ), the same processes as above are performed.

In FIG. 16, when the CRC code error occurs in the transmission request packet unit (REQ/Data) from the control data end unit (16-1), the processor access controller (PACSP) in the switch in module locks the connection path in the DMA connection selector and sends the transmission request packet unit (REQ/Data) to the processor access controller (PAC) in the central controller (CC) (16-2).

The processor access controller (PAC) detects the CRC code error in the transmission request packet unit (REQ/Data), and returns the ACK/BUSY signal to the control data end unit (16-3). Further, the control data end unit sends the ENDF signal when receiving the ACK/BUSY signal (16-4).

The processor access controller (PACSP) in the switching module returns to the waiting state when receiving the ENDF signal, the processor access controller (PAC) in the central controller (CC) sends the individual PAC sequence reset signal to the control data end unit (16-5).

The control data end unit performs the interrupt based on the individual PAC sequence reset signal, and resets the PAC sequence. Further, the control data end. unit sends the ENDF signal (16-6), and sends again the transmission request packet unit (REQ/Data) (16-7).

What is claimed is:

1. A switching system comprising:
    a central controller which transfers control data to a plurality of end units; and
    a switching module including a processor access controller which relays the control data transferred between the central processor and the plurality of end units;
    wherein the central controller and the processor access controller comprise a transmitter and a receiver which set the control data based on a direct memory access (DMA) communication therebetween and based on an SD/SCN signal, to each bit position of each fixed time slot,
    said transmitter and said receiver each including a first bit converter for converting control data from X bits to Y bits (X>Y) and a second bit converter for converting control data from Y bits to X bit, and
    said switching system further comprising an optical fiber cable having an electric-optical converter and an optical-electric converter at both ends thereof to couple the transmitter and the receiver.

2. A switching system as claimed in claim 1, wherein the processor access controller comprises a transfer means which copies a particular SD signal data bit within a plurality of SD signal data transferred from the central controller in order to control the objective apparatus, and transfers simultaneously the copied SD signal data bit to the control data end units in each objective apparatus.

3. A switching system as claimed in claim 1, wherein the processor access controller performs priority selection based on an apparatus number of each objective apparatus, when receiving control data transmission requests based on the DMA communication which are generated simultaneously by the plurality of objective apparatuses and are sent to the central controller, and switches the connection path in the DMA connection selector to the preferentially selected objective apparatus.

4. A switching system as claimed in claim 1, wherein each of the central controller and process access controller comprises a setting means which sets a signal indicating procedures based on the DMA communication to the bit position of the fixed time slot.

5. A switching system as claimed in claim 1, wherein each of the central controller and process access controller comprises a transfer means which edits the control data bit of the SD/SCN signal into a data format by attaching the CRC error correction code for each of objective apparatuses.

6. A switching system as claimed in claim 1, wherein each of the central controller and process access controller comprises a transfer means which transfers the control data by switching alternately between a through transfer and an inversion transfer, the through transfer being performed by sending the control data with a predetermined block without any change, and the inversion transfer being performed by sending the control data after inversion, except for synchronous pattern.

7. A switching system as claimed in claim 1, wherein each of the central controller and process access controller comprises a setting means which sets a fixed bit which becomes inconsistent between sequential synchronous patterns having predetermined numbers and the control data, to a particular bit position in the control data area.

* * * * *